United States Patent [19]

Ogura et al.

[11] Patent Number: 4,707,419

[45] Date of Patent: Nov. 17, 1987

[54] THIN FILM EL DEVICES AND PROCESS FOR PRODUCING THE SAME

[75] Inventors: Takashi Ogura; Koichi Tanaka, both of Tenri; Koji Taniguchi; Masaru Yoshida, both of Nara; Akiyoshi Mikami, Yamatotakada, all of Japan

[73] Assignee: Sharp Kabushiki Kaisha, Osaka, Japan

[21] Appl. No.: 867,814

[22] Filed: May 27, 1986

[30] Foreign Application Priority Data

May 28, 1985 [JP] Japan ............................... 60-116071
Oct. 24, 1985 [JP] Japan ............................... 60-240163

[51] Int. Cl.[4] .......................... B32B 9/04; B32B 17/06

[52] U.S. Cl. .................................... 428/690; 313/503; 428/691; 428/917

[58] Field of Search ................ 313/503; 428/690, 691, 428/917

[56] References Cited

U.S. PATENT DOCUMENTS 3,950,668 4/1976 Mattis et al. ........................ 313/468
3,980,887 9/1976 Mattis et al. .................. 252/301.4 S
4,162,232 7/1979 Yale ............................ 252/301.4 H
4,508,610 4/1985 Freeman et al. ............ 252/301.6 S

*Primary Examiner*—Nancy A. Swisher
*Attorney, Agent, or Firm*—Cohen, Pontani & Lieberman

[57] ABSTRACT

The present invention provides a thin film EL device comprising an electrode layer, an emitting layer and an electrode layer formed on a substrate one over another, and an insulating layer interposed between the three layers, the emitting layer containing atoms of a rare-earth element and fluorine atoms in its host material, the atom ratio (F/RE) of the fluorine atoms (F) to the rare-earth atoms (RE) being adjusted to the range of 0.5 to 2.5, and a process for producing the EL device being characterized in that the emitting layer is prepared by forming a film under a condition substantially free from oxygen gas and/or moisture and subjecting the film to a heat treatment at a temperature of 200° C. to 700° C. so that the host material of the emitting layer contains atoms of a rare-earth element (RE) and fluorine atoms (F) in an adjusted atom ratio (F/RE) in the range of 0.5 to 2.5.

The present invention affords a thin film EL device which emits, for example, a green luminescence with a high brightness.

13 Claims, 7 Drawing Figures

THIN FILM EL DEVICES AND PROCESS FOR PRODUCING THE SAME

BACKGROUND OF THE INVENTION

1. Field of the Invention

The present invention relates a thin film EL (electroluminescence) device for emitting an EL in response to the application of an electric field, and more particularly to a thin film EL device wherein the emitting layer is doped with a compound of rare earth element for providing luminescent centers.

2. Description of the Prior Art

To commercially realize multicolor displays with use of thin film EL devices, it has been strongly desired to provide multicolor luminescences with a high brightness. Thin film EL devices for producing an orange luminescence with a high brightness have already been realized with an emitting layer doped with Mn for giving luminescent centers.

The present applicant has already filed a patent application for a thin film EL device for producing a bright red luminescence (U.S. patent application Ser. No. 819,217 filed on Jan. 15, 1986). As the next step, therefore, it is desired to develop a useful thin film EL device for emitting a bright luminescence of another color (e.g., green).

When the emitting layer is made of a material prepared from a II–VI compound, such as ZnS, doped with the fluoride of a rare-earth element, EL devices emitting luminescences of various colors are obtained with use of different rare-earth elements. For example, LUMOCEN devices (D. Kahng, Appl. Phys. Lett., vol. 13, pp. 210–212, 1968) have been proposed which produce green, red, blue and white luminescences when $TbF_3$, $SmF_3$, $TmF_3$ and $PrF_3$, respectively, are used as luminescent centers. Nevertheless, these devices have problems in respect of brightness, and those having a brightness sufficient for use have yet to be developed.

An emitting layer wherein the luminescent centers are provided by the fluoride of a rare-earth element is prepared by the electron beam vacuum evaporation process using sintered pellets of a mixture of ZnS with a suitable amount of the fluoride, or by the RF (radio frequency) sputtering process using a mixture of the fluoride in the form of a powder and finely divided ZnS as the target. With the emitting layer produced by such a process, the fluoride of rare-earth element (RE) serving as the luminescent centers is incorporated in the ZnS crystals usually in the form of $RE.F_3$ molecules, and the ratio F/RE of the fluorine atoms F to the atoms of rare-earth element RE is 3 or very approximate to 3. However, the rare-earth fluoride which is in the form of a relatively large molecule, when incorporated in ZnS crystals, impairs the crystallinity of the neighboring portions of the host material, entailing a reduced luminescence brightness and lower luminescence efficiency.

If it is then possible to substitute the rare earth atom RE for the zinc atom Zn, the impairment of the crystallinity of ZnS can be diminished to a lesser extent. Nevertheless, the atom of rare-earth element is trivalent ($RE^{3+}$) but zinc is divalent ($Zn^{2+}$), so that if $RE^{3+}$ is substituted for $Zn^{2+}$, there remains a plus positive charge as an excess. The charge can be offset by providing one fluorine atom with a negative valence of one ($F^{-1}$) at an interlattice position. Thus, when it is assumed that all the rare-earth atoms are ideally substituted for zinc, the ratio of the fluorine atoms to the atoms of rare-earth elements in the emitting layer, F/RE, is 1.

With thin film EL devices, therefore, the emitting layer formed is subjected to a heat treatment in order to disperse the luminescent centers uniformly through the layer and improve the crystallinity of the host material of the layer. It is desired that the heat treatment be conducted at the highest possible temperature to promote the diffusion of the elements and fully substitute atoms of the rare-earth element for atoms of the emitting layer host material. However, in the prior art in the case of thin film EL devices incorporating a rare earth fluoride as the luminescent centers, the heat treatment, if conducted, lowered the luminescence brightness of the emitting layer. Accordingly, the optimum heat-treatment temperature for giving the highest brightness is usually in the range of 400° C. to 500° C. (see, for example, Unexamined Japanese Patent Publication SHO 59-56390). Consequently, the heat treatment which can be conducted only at a relatively low temperature fails to fully improve the crystallinity of the emitting layer host material and permits the emitting layer to have an atom ratio F/RE of about 3, making it difficult to obtain a thin film EL device of satisfactory luminescence characteristics.

SUMMARY OF THE INVENTION

The present invention provides a thin film EL device comprising an electrode layer, an emitting layer and an electrode layer formed on a substrate one over another, and an insulating layer interposed between the three layers, the emitting layer containing atoms of a rare-earth element and fluorine atoms in its host material, the atom ratio (F/RE) of the fluorine atoms (F) to the rare-earth atoms (RE) being adjusted to the range of 0.5 to 2.5.

The present invention further provides a process for producing a thin film EL device comprising an electrode layer, an emitting layer and an electrode layer formed on a substrate one over another, and an insulating layer interposed between the three layers, the process being characterized in that the emitting layer is prepared by forming a film under a condition substantially free from oxygen gas and/or moisture and subjecting the film to a heat treatment at a temperature of 200° C. to 700° C. so that the host material of the emitting layer contains atoms of a rare-earth element (RE) and fluorine atoms (F) in an adjusted atom ratio (F/RE) in the range of 0.5 to 2.5.

The present invention affords a thin film EL device which emits, for example, a green luminescence with a high brightness.

Whereas the host material of the conventional emitting layer doped with a fluoride of rare-earth element contains rare-earth atoms (RE) and fluorine atoms (F) in an atom ratio (F/RE) of 3 or very approximate to 3, we have found, as one of the features of the invention, that the luminescence brightness of the thin film EL device can be greatly improved by adjusting the ratio (F/RE) to 0.5 to 2.5.

The present invention further provides a simplified process for fabricating a thin film EL device wherein the above-mentioned atom ratio (F/RE) is in the range of 0.5 to 2.5. One of the features of this process is that the emitting layer is formed under a condition substantially free from oxygen gas and/or moisture. The condition substantially free from oxygen gas and/or moisture can be set up by degassing a container for forming the emitting layer, e.g., bell jar at least once under a high vacuum, preferably subsequently substituting its interior with an inert gas, such as Ar or $N_2$, before the formation of the emitting layer.

The atom ratio (F/RE) is adjustable to the range of 0.5 to 2.5 by forming the emitting layer from a host material, such as ZnS, which is doped with 1 to 5 mole % of $TbF_3$ (the material having an atom ratio (F/Tb) of 3), and heat-treating the resulting layer at a temperature in the range of 500° to 700° C. which is different from the temperature conventionally used.

The atom ratio (F/RE) is pre-adjustable by doping a sulfide host material, such as ZnS, with the fluoride of a rare-earth element and the sulfide of the rare-earth element in controlled amounts. When the host material is ZnS in this case, 1 to 4 mole % of $TbF_3$ and up to 2 mole % of $Tb_2S_3$ are used for doping.

DESCRIPTION OF THE PREFERRED EMBODIMENTS

1. Structure of thin film El device

Figure 1:
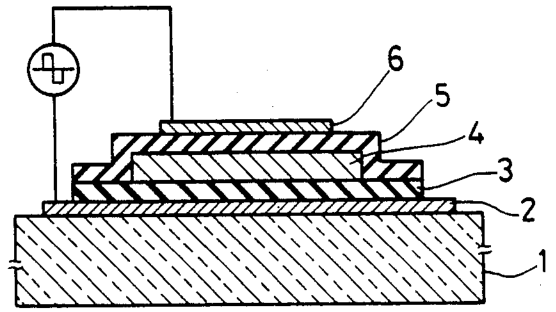
FIG. 1 is a diagram showing the structure of a thin film EL device embodying the present invention.

FIG. 1 is a diagram schematically showing the structure of a thin film EL device embodying the present invention.

Referring to FIG. 1, a transparent substrate 1 is formed with a transparent electrode 2, a lower insulating layer 3, an emitting layer 4, an upper insulating layer 5 and a rear electrode 6, these electrodes and layers being superposed in the order mentioned. When an a.c. voltage is applied across the transparent electrode 2 and the rear electrode 6, the emitting layer 4 emits a green El through the transparent electrode 2 and the transparent substrate 1. In some case, the insulating layers 3, 5 may be omitted.

(a) Generally used as the substrate 1 is a 1.2-mm-thick plate of "7059" (product of CORNING GLASS WORKS) or #LE-30 (product of HOYA GLASS CORP.).

Preferably, the substrate 1 has a thickness of 0.1 to 5.0 mm.

(b) The transparent electrode 2 is an $In_2O_3$ (indium oxide) film having a thickness of 140 nm and formed on the substrate by sputtering. Alternatively, an $SnO_2$ (tin oxide) film may be used as the transparent electrode 2. It is desired that the film thickness be in the range of 100 to 600 nm. The film can be formed also by resistive heating evaporation, electron beam evaporation or ion plating.

(c) The lower insulating layer 3 is a composite film of $SiO_2$ and $Si_3N_4$, which is formed by sputtering to a thickness of 2000 angstroms. The layer 3 may be prepared from $Y_2O_3$, $ZrO_2$, $HfO_2$, $TiO_2$ or $Ta_2O_5$ and can be formed by electron beam evaporation. The preferred film thickness is about 1000 to about 3000 angstroms.

(d) The emitting layer 4 is formed over the lower insulating layer 3 to a thickness of 7000 angstroms by RF sputtering using a sputtering apparatus, Model SPF332 product of ANELVA). The procedure is as follows.

First, a powder mixture of finely divided ZnS and 2 mole % of finely divided $TbF_3$ is prepared as a sputtering target. The substrate 1 having the transparent electrode 2 and the lower insulating layer 3 formed thereon and the target are placed, as opposed to each other, in position within the bell jar of the sputtering apparatus, and the bell jar is evacuated to a vacuum of up to $10^{-5}$ torr. Next, the substrate is heated to a temperature of 200° C. by a heater disposed at the rear side of the substrate 1. Ar gas is introduced into the bell jar. Pre-sputtering is then conducted to clean the surface of the target while holding a shutter between the substrate 1 and the target closed. With the pre-sputtering operation thereafter interrupted, the bell jar is evacuated to a high vacuum again to remove the $O_2$ gas and/or moisture and other impurity gas relased from the target. Ar gas is admitted into the bell jar again, and then pre-sputtering is resumed. Subsequently, the shutter is opened to conduct primary sputtering and form the emitting layer 4.

It is desired that 1 to 4 mole % of finely divided $TbF_3$ be admixed with finely divided ZnS to provide the target. When desired, up to about 2 mole % of finely divided $Tb_2S_3$ may be further admixed with the mixture. The substrate 1 is heated preferably at a temperature of 100° to 350° C.

The emitting layer 4, which is formed by RF sputtering, may alternatively be formed by electron beam evaporation. In this case, sintered pellets prepared from ZnS doped with 1 to 4 mole % of $TbF_3$ are used as the evaporation source. As in the foregoing procedure of RF sputtering, the emitting layer 4 is formed by placing the substrate 1 and the evaporation source as opposed to each other within a bell jar, evacuating the jar to a vacuum of up to $10^{-5}$ torr, heating the substrate at 100° to 350° C., irradiating the source with an electron beam with a shutter between the substrate 1 and the source closed, thereafter evacuating the jar to a high vacuum again with the irradiation interrupted, and subsequently irradiating the source with the beam with the shutter opened. The layer 4 is formed over the lower insulating layer 3 to a thickness of 7000 angstroms.

When either of the above processes is resorted to, it is desired that the emitting layer 4 formed be 3000 to 10000 angstroms in thickness.

Next, the substrate 1 having the emitting layer 4 formed thereon is placed in a vacuum oven and heat-treated (annealed) at 600° C. for 1 hour in a vacuum.

(e) The upper insulating layer 5 is formed over the emitting layer 4 from the same material and by the same method as the lower insulating layer 3 to a thickness of 2000 angstroms. The thickness is preferably 1000 to 5000 angstroms.

(g) The rear electrode 6 is formed on the upper insulating layer 5 to a thickness of 200 nm by vacuum evaporation using aluminum. The thickness is preferably about 100 to about 400 nm.

2. Charateristics of thin film EL device

When an a.c. electric voltage is applied across the transparent electrode 2 and the rear electrode 6, the a.c. electric field is induced into the emitting layer 4, permitting carriers from the host material of the layer 4 to be led as hot carriers to one of the interfaces of the layer 4 corresponding to the polarity of the electric field to provide internal charges. When the polarity of the electric field subsequently reverses, the internal charges are superposed on the induced electric field, and the hot carriers are swept to the other interface of the emitting layer 4. In this process, the carriers collide with and excite the Tb ion of the $TbF_x$ dopant providing the luminescent centers, causing the Tb to release an electromagnetic spectrum. This spectrum is observed as a green El through the glass substrate 1.

(a) Relation between the impurities in emitting layer and the highest annealing temperature.

In the prior art high-temperature heat treatment or annealing reduced the brightness of the thin film EL device wherein the fluoride of a rare-earth element provides luminescent centers. This appears attributable primarily to the presence of the gas remaining in the bell jar during sputtering or evaporation for forming the emitting layer, or of the gas absorbed by the target or evaporation source. Such gas, which is chiefly $O_2$, and/or $H_2O$ become incorporated into the emitting layer as impurities during annealing, reacting with ZnS or the rare-earth element to degrade the emitting layer.

Figure 2:
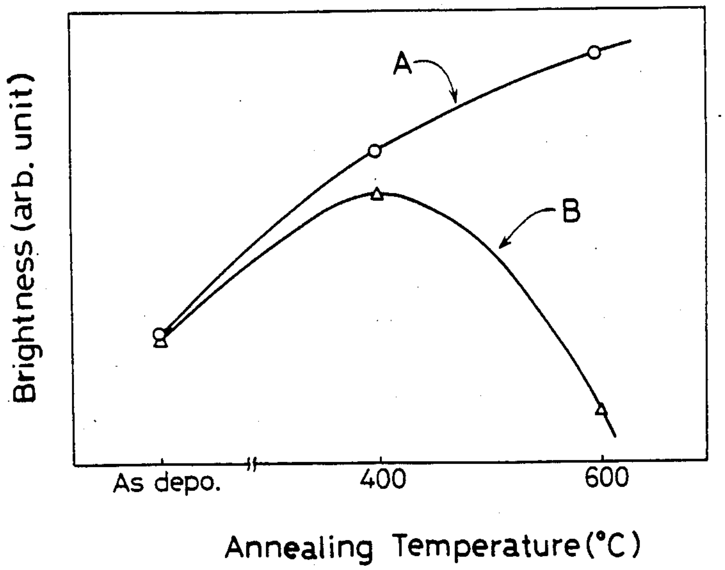
FIG. 2 is a characteristics diagram showing the relation between the temperature for annealing the emitting layer and luminescence brightness as determined for emitting layers containing different amounts of impurities.

FIG. 2 shows the relation between the annealing temperature and the luminescence brightness as established using a thin film EL device fabricated under the conditions of the above item 1 (curve A) and a thin film EL device prepared without degassing the bell jar during the sputting process while interrupting the sputtering operation as described in item 1-(d) (curve B). FIG. 2, curve A shows that the brightness increases with the rise of the annealing temperature, while curve B indicates that the highest brightness achieved at about 400° C. decreases as the temperature further rises. Thus, FIG. 2 reveals that the removal of the remaining gas ($O_2$ gas) and moisture from the bell jar in the step of forming the emitting layer 4 very effectively inhibits incorporation of impurities into the layer 4, reducing the amount of impurities that would react with Tb or F within the layer 4 and consequently preventing formation of the reaction product of impurities despite the high-temperature annealing. FIG. 2 further shows that the luminescent centers provided by the dopant in the layer 4 are so controlled by the annealing operation as to give an F/Tb ratio of less than 3 instead of remaining in the form of $TbF_3$ (F/Tb=3), affording improved luminescence characteristics to the emitting layer 4.

(b) F/Tb control characteristics of annealing

Figure 3:
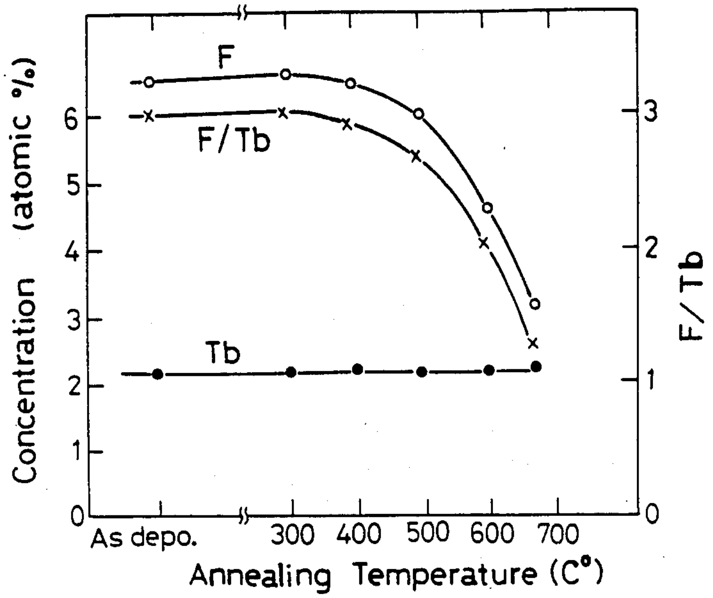
FIG. 3 is a characteristics diagram showing F and Tb concentrations and F/Tb at varying temperatures for annealing the emitting layer.

FIG. 3 shows the F and Tb concentration measurements and F/Tb values obtained for the emitting layers of thin film EL devices which were prepared under the same conditions as described in item 1 except that the annealing step of item 1-(d) was performed for 1 hour at varying temperatures of 300° to 680° C. FIG. 3 reveals that the F concentration markedly decreases when the annealing temperature is raised beyond 500° C., with the result that F/Tb is controllable to a value approximate to 1.

Figure 4:
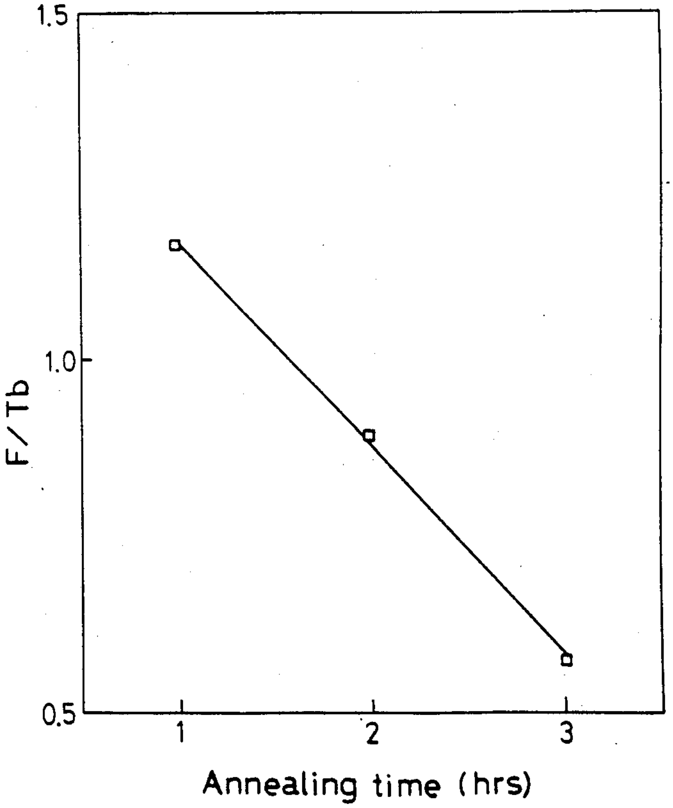
FIG. 4 is a diagram showing the F/Tb characteristics determined when the annealing time for the emitting layer is varied.

FIG. 4 shows the F/Tb concentration ratio measurements of emitting layers obtained for thin film EL devices which were prepared under the same conditions as described in item 1 except that the annealing step of item 1-(d) was performed at 600° C. for varying periods of time, i.e., for 1 to 3 hours. It is seen that the F/Tb ratio is controllable further below 1 by lengthening the annealing time beyond 1 hour.

(c) Relation between F/Tb and luminescence brightness

Figure 5:
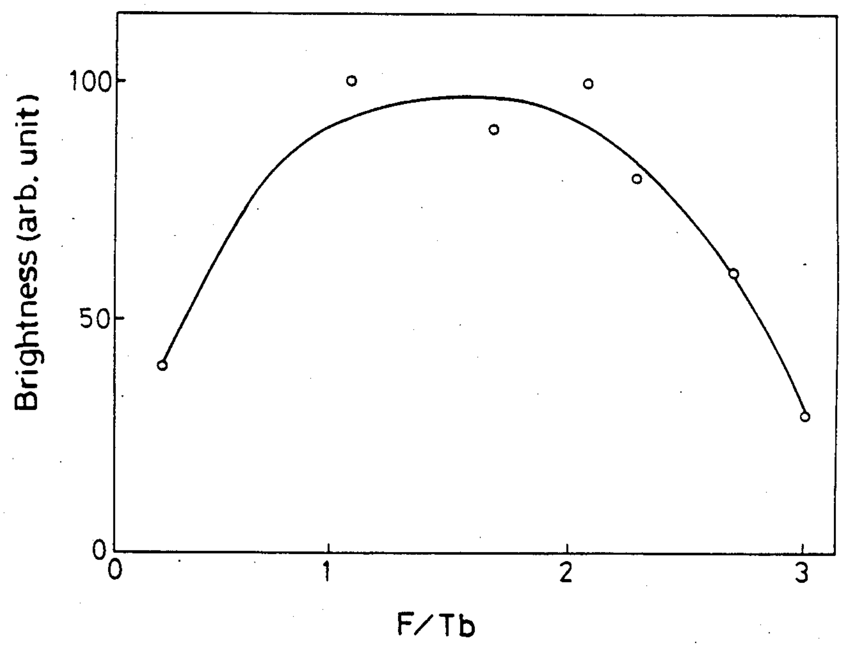
FIG. 5 is a diagram showing the luminescence brightness characteristics of thin film El device at varying F/Tb values of the emitting layer.

FIG. 5 is a characteristics diagram showing the relation between the F/Tb of the emitting layer and the luminescence brightness as determined using thin film EL devices in which the emitting layer 4 had varying F/Tb values and which were prepared under the same conditions as given in item 1 except that the annealing conditions (temperature and time) only were varied to control F/Tb. The diagram reveals that the brightness is high when F/Tb is in the range of 0.5 to 2.5, especially in the range of 1.0 to 2.0.

(d) Luminescence brightness vs. applied voltage characteristics

Figure 6:
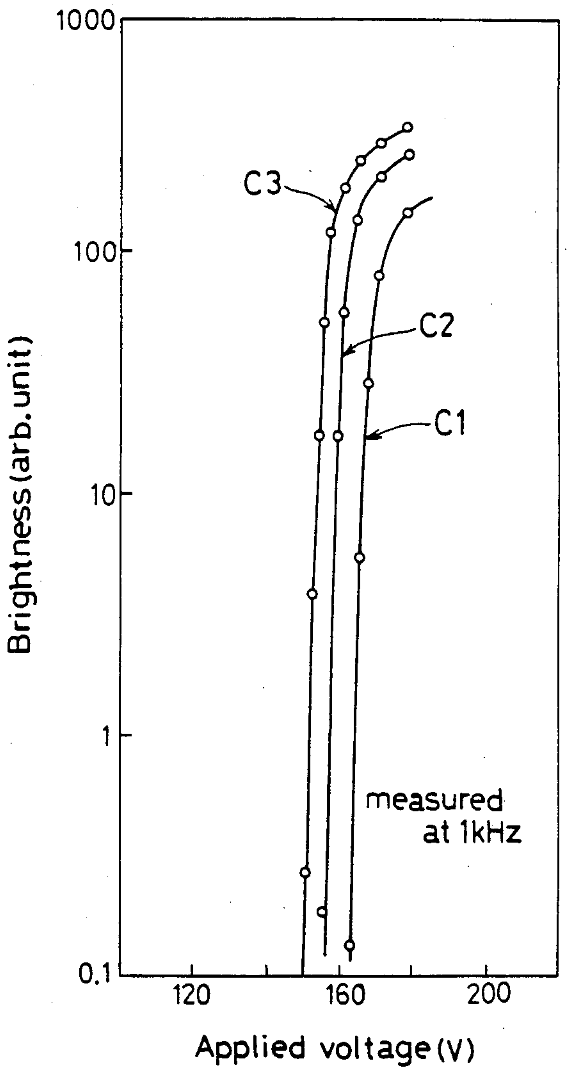
FIG. 6 is a diagram showing the luminescence brightness-applied voltage characteristics as determined for emitting layers annealed under different conditions.

FIG. 6 shows the luminescence brightness vs. applied voltage characteristics as determined by applying voltages at 1 kHz across the transparent electrode 2 and the rear electrode 6 to produce a green luminescence, using three thin film EL devices fabricated under the same conditions as given in item 1 except that the temperature of annealing in item 1-(d) was changed. Curve C1 in the drawing represents a device prepared without annealing, curve C2 one annealed at 400° C. and curve C3 another one annealed at 600° C. Curve C3 indicates the highest brightness efficiency relative to the applied voltage. It therefore follows that the thin film EL device having an emitting layer 4 annealed at 600° C. produces an EL of higher brightness than those prepared under other conditions. This reveals that the emitting layer 4 contains a reduced amount of impurities that would react with Tb or F and that the high-temperature annealing treatment does not result in reaction products but controls F/Tb to the range of 0.5 to 2.5.

(e) Control of F/Tb by doping sulfide host material with fluoride and sulfide of rare-earth element The F/Tb ratio of the emitting layer is controllable also by using a powder mixture prepared by admixing finely divided $TbF_3$ and finely divided $Tb_2S_3$ with finely divided ZnS as the sputtering target in item 1-(d).

Figure 7:
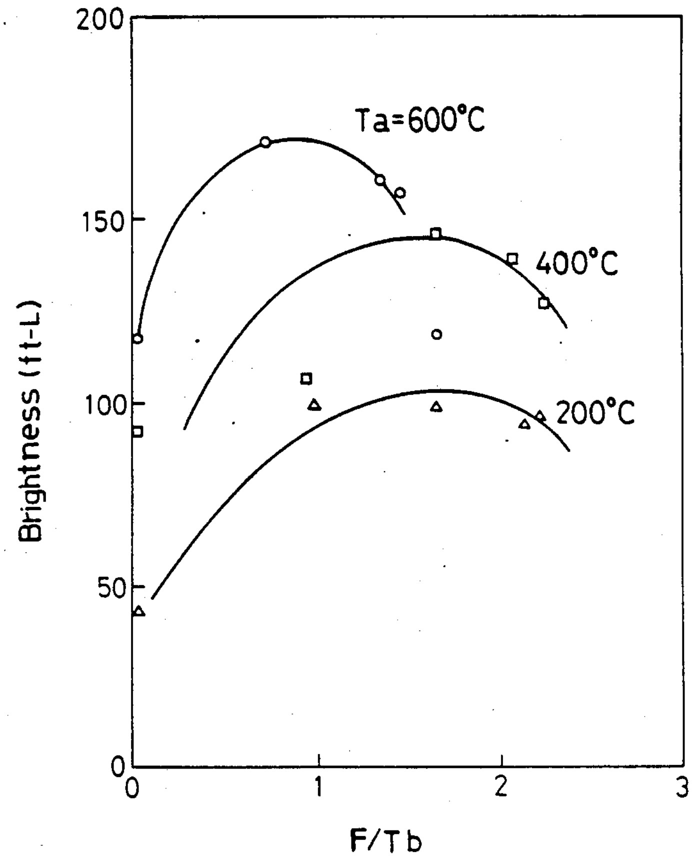
FIG. 7 is a diagram showing the luminescence brightness characteristics as determined when the F/Tb of the emitting layer is varied by doping the emitting layer host material with varying amounts of $TbF_3$ and $Tb_2S_3$.

FIG. 7 shows the luminescence brightness characteristics at varying F/Tb values plotted as abscissa as determined using thin film EL devices prepared according to the embodiment of item 1. Finely divided $Tb_2S_3$ and $TbF_3$ were admixed with finely divided ZnS in varying concentrations as listed in Table 1 for use as the target of item 1-(d) to form emitting layers 4, which were annealed at a temperature of 600° C., 400° C. or 200° C.

While F/Tb is controllable by varying the concentrations of $TbF_3$ and $Tb_2S_3$ doping the ZnS target host material and the annealing temperature, FIG. 7 shows that even when the annealing temperature is below 500°

C. in the present case, F/Tb can be controlled to the range of 0.5 to 2.5, especially to the range of 1.0 to 2.0, and that under the same annealing condition, a higher brightness is available when the ratio is in this range than when it is outside the range. When the emitting layer 4 is to be formed by electro beam evaporation, sintered pellets of ZnS doped with $TbF_3$ and $Tb_2S_3$ in the proportions of Table 1 may be used to similarly control the F/Tb ratio of the layer 4.

TABLE 1

| No. | 1 | 2 | 3 | 4 | 5 |
|---|---|---|---|---|---|
| $Tb_2S_3$ (mole %) | 0 | 0.25 | 0.50 | 0.75 | 1.00 |
| $TbF_3$ (mole %) | 2.0 | 1.5 | 1.0 | 0.5 | 0 |

The terbium and fluorine concentrations of the emitting layers of the above embodiments were determined by Electron Probe Micro Analyzer Model JXA-33 (product of JEOL).

While the foregoing embodiments incorporate $TbF_3$ serving as luminescent centers, the present invention is not limited to these embodiments but can be embodied with use of fluorides of other rare-earth elements. Besides ZnS, sulfides and selenides such as CaS, CdS and ZnSe are usable as host materials for the emitting layer.

When fluorides of rare-earth elements other than $TbF_3$ are used for providing luminescent centers, for example, when $SmF_3$, $PrF_3$ or the like is used, finely divided $Sm_2S_3$ or $Pr_2S_3$ is used in place of $Tb_2S_3$ in item 2-(e) above.

According to the present invention described above in detail, the incorporation of impurities into the emitting layer is inhibited during the formation of the layer, and the emitting layer formed is annealed at a temperature higher than 500° C., or a rare-earth sulfide dopant is used for forming the emitting layer, whereby the atoms of rare-earth element (RE) and the fluorine atoms (F) of a rare-earth fluoride doping the emitting layer host material to provide luminescent centers are controlled to an atom ratio (F/RE) of 0.5 to 2.5. Consequently the rare-earth element is substituted for atoms of the host material in the emitting layer to provide a thin film EL device of improved luminescence characteristics.

What is claimed is:

1. A thin film electroluminescence device comprising
a substrate;
a first electrode layer on said substrate;
a second electrode layer;
interposed between said first and second electrode layers, an emitting layer comprising a host material having distributed therethroughout atoms of a rare earth element and fluorine atoms, the atom ratio (F/RE) of the fluorine atoms (F) to the rare earth atoms (RE) being between 0.5 and 2.5; and
an insulating layer interposed between said first electrode layer and said emitting layer and said emitting layer and said second electrode layer.

2. The thin film electroluminescence device of claim 1, wherein the atom ratio (F/RE) is adjusted in the range of from 1.0 to 2.0.

3. The thin film electroluminescence device of claim 1, wherein the host material of the emitting layer is ZnS, ZnSe, CaS or CdS.

4. The thin film electroluminescence device of claim 1, wherein the host material material of the emitting layer is ZnS.

5. The thin film electroluminescence device of claim 1, wherein the rare earth element is Tb, Sm, Tm, or Pr.

6. The thin film electroluminescence device of claim 1, wherein the rare earth element is Tb.

7. The thin film electroluminescence device of claim 4, wherein the host material is doped with 1 to 5 mole % of $TbF_3$.

8. A thin film electroluminescence device comprising
a substrate;
a first electrode layer on said substrate;
a second electrode layer; and
interposed between said first and second electrode layers, an emitting layer comprising a host material having distributed therethroughout atoms of a rare earth element and fluorine atoms, the atom ratio (F/RE) of the fluorine atoms (F) to the rare earth atoms (RE) being adjusted in the range of from 0.5 to 2.5.

9. The thin film electroluminescence device of claim 8, wherein the host material of the emitting layer is ZnS, ZnSe, CaS or CdS.

10. The thin film electroluminescence device of claim 8, wherein the host material of the emitting layer is ZnS.

11. The thin film electroluminescence device of claim 8, wherein the rare earth element is Tb, Sm, Tm or Pr.

12. The thin film electroluminescence device of claim 8, wherein the rare earth element is Tb.

13. The thin film electroluminescence device of claim 8, wherein the host material is doped with 1 to 5 mole % of $TbF_3$.

* * * * *